(12) United States Patent
Gupta et al.

(10) Patent No.: US 8,738,359 B2
(45) Date of Patent: May 27, 2014

(54) SCALABLE KNOWLEDGE EXTRACTION

(75) Inventors: Rakesh Gupta, Mountain View, CA (US); Quang Do, Champaign, IL (US)

(73) Assignee: Honda Motor Co., Ltd., Tokyo (JP)

( * ) Notice: Subject to any disclaimer, the term of this patent is extended or adjusted under 35 U.S.C. 154(b) by 1558 days.

(21) Appl. No.: 11/873,631

(22) Filed: Oct. 17, 2007

(65) Prior Publication Data
US 2008/0097951 A1    Apr. 24, 2008

Related U.S. Application Data

(60) Provisional application No. 60/852,719, filed on Oct. 18, 2006.

(51) Int. Cl.
*G06F 17/27* (2006.01)

(52) U.S. Cl.
USPC ...................... 704/9; 704/1; 704/10

(58) Field of Classification Search
CPC ......... G06F 17/27; G06F 17/21; G06F 17/20; G06F 17/274; G06F 17/2785
USPC .................... 704/9, 1, 10
See application file for complete search history.

(56) References Cited

U.S. PATENT DOCUMENTS

| | | | |
|---|---|---|---|
| 5,903,858 A * | 5/1999 | Saraki .............................. | 704/4 |
| 6,675,159 B1 * | 1/2004 | Lin et al. ............................... | 1/1 |
| 6,886,010 B2 | 4/2005 | Kostoff | |
| 2002/0042707 A1 | 4/2002 | Zhao et al. | |
| 2003/0191625 A1 * | 10/2003 | Gorin et al. ....................... | 704/1 |
| 2005/0049852 A1 | 3/2005 | Chao | |
| 2005/0197992 A1 | 9/2005 | Kipersztok et al. | |
| 2006/0026203 A1 * | 2/2006 | Tan et al. .................... | 707/104.1 |
| 2006/0253273 A1 * | 11/2006 | Feldman et al. .................. | 704/9 |

OTHER PUBLICATIONS

Regina Barzilay et al, *Modeling Local Coherence: An Entity-based Approach*, Proceedings of the 43rd Annual Meeting of the ACL, Jun. 2005, pp. 141-148.
Oren Glickman et al, *Identifying Lexical Paraphrases from a Single Corpus: A Case Study for Verbs*, Computer Science Department Bar Ilan University, pp. 1-8, Ramat Gan, Israel.
Rakesh Gupta et al, *Common Sense Data Acquisition for Indoor Mobile Robots*, Nineteenth National Conference on Artificial Intelligence (AAAI-04), Jul. 25-29, 2004, pp. 1-6.
Dekang Lin et al, *Dirt—Discovery of Inference Rules from Text*, Department of Computer Science, University of Alberta, pp. 1-6. 2001.

(Continued)

*Primary Examiner* — Qi Han
(74) *Attorney, Agent, or Firm* — Fenwick & West LLP; Mark E. Duell

(57) ABSTRACT

The present invention provides a method for extracting relationships between words in textual data. Initially, a classifier is trained to identify text data having a specific format, such as situation-response or cause-effect, using a training corpus. The classifier receives input identifying components of the text data having the specified format and then extracts features from the text data having the specified format, such as the part of speech for words in the text data, the semantic role of words within the text data and sentence structure. These extracted features are then applied to text data to identify components of the text data which have the specified format. Rules are then extracted from the text data having the specified format.

18 Claims, 7 Drawing Sheets

(56) References Cited

OTHER PUBLICATIONS

Vasin Punyakanok et al, *Shallow Parsing by Inferencing with Classifiers*, Proceedings of CoNLL-2000 and LLL-2000, 2000, pp. 107-110.

Dan Roth, *Learning to Resolve Natural Language Ambiguities: A Unified Approach*, AAAI-98, Nov. 3, 1998, pp. 1-9.

Roman Yangarber, *Counter-Training in Discovery of Semantic Patterns*, Proceedings of the 41$^{st}$ Annual Meeting of the Association for Computational Linguistics (ACL2003), 2003, pp. 1-8.

U.S. Appl. No. 10/723,112, filed Nov. 26, 2003, first named inventor Christopher Campbell.

PCT International Search Report and Written Opinion, PCT/US2007/081746, May 5, 2008.

* cited by examiner

| | | |
|---|---|---|
| If | | |
| you | viewer 625 | adverbial |
| see | V: see 620 | |
| trouble | thing viewed 625 | 630 |
| , | | |
| report | | V: report 620 |
| it | | thing reported 635 |
| to | | |
| an | | entity reported to |
| adult | | 635 |
| . | | |

FIG. 6

| | | | | |
|---|---|---|---|---|
| If | | | | |
| it | metaphorical agent 745 | | | |
| is | | | | |
| raining | V: rain 740 | adverbial 720 | | |
| , | | | | |
| you | | owner 745 | | agent 745 |
| should | | general modifier | | |
| have | | V: have 740 | | |
| the | | possession 745 | | patient 745 |
| umbrella | | | | |
| before | | | temporal 730 | |
| going | | | | V: go 745 |
| outside | | | | direction 710 |
| . | | | | |

FIG. 7

SCALABLE KNOWLEDGE EXTRACTION

RELATED APPLICATIONS

This application claims priority, under 35 U.S.C. §119(e), from U.S. provisional application No. 60/852,719, filed on Oct. 18, 2006, which is incorporated by reference herein in its entirety.

FIELD OF THE INVENTION

This invention relates generally to data collection, and more particularly to a system and method for identifying and analyzing sentences having a specified form.

BACKGROUND OF THE INVENTION

Identification and classification of actions is of interest in machine learning applications as it provides a mechanism for training robots of the consequences of different actions. For example, data describing causal relationships can be used to specify how different actions affect different objects. Such relational data can be used to generate a "commonsense" database for robots describing how to interact with various types of objects.

However, conventional techniques for acquiring cause-effect relationships are limited. Existing distributed collection techniques receive relationship data from volunteers, which provides an initial burst of data collection. However, over time, data collection decreases to a significantly lower amount. Hence, conventional data collection methods are not scalable to provide a continuous stream of data.

What is needed is a system and method for automatically extracting causal relations from gathered text.

SUMMARY OF THE INVENTION

The present invention provides a method for identifying text data having a specific form, such as cause-effect, situation-response or other causal relationship and generating rules describing knowledge from the text data. In one embodiment, a classifier is trained to identify the specific form using data stored in a training corpus. For example, the training corpus includes text data describing relationships between an object and an action or a situation and a response and the classifier is trained to identify characteristics of the stored text data. The trained classifier is then applied to a second text corpus to identify components of the text corpus, such as sentences, having similar characteristics to the training corpus. Data from the text corpus having the specific form is then stored and used to generate rules describing content of the text data having the specific form. The generated rules are stored in a computer storage medium to facilitate use of knowledge from the text corpus.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 6 is an example of a generated rule according to one embodiment of the present invention.

FIG. 7 is an example of a generated rule according to one embodiment of the present invention.

DETAILED DESCRIPTION OF THE INVENTION

Figure 1:
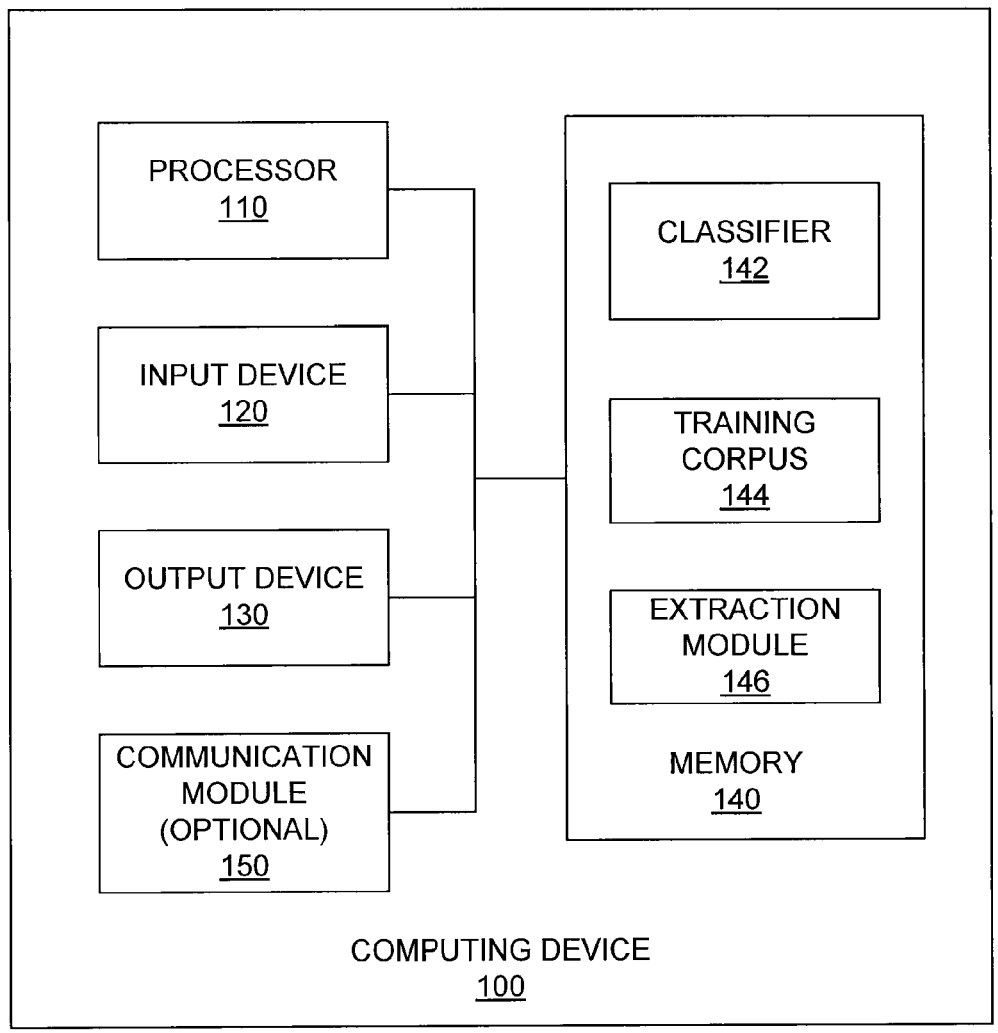
FIG. 1 is an illustration of a computing device in which one embodiment of the present invention operates.

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is an illustration of a computing device 100 in which one embodiment of the present invention may operate. The computing device 100 comprises a processor 110, an input device 120, an output device 130 and a memory 140. In an embodiment, the computing device 100 further comprises a communication module 150 including transceivers or connectors.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computing device 100 such as, a cursor controller or a keyboard. In one embodiment, the input device 120 can include an alphanumeric input device, such as a QWERTY keyboard, a key pad or representations of such created on a touch screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM or other non-volatile storage device, combinations of the above, or some other memory device known in the art. The memory 140 comprises a classifier 142, a training corpus 144 and an extraction module 146, and is adapted to communicate with the processor 110, the input device 120, the output device 130 and/or the communication module 150.

The classifier 142 provides information for determining whether text data or a subset of text data has the specified form. For example, the classifier 142 includes instructions for applying a discriminative learning algorithm, such as the SNoW learning architecture as described in Roth, "Learning to Resolve Natural Language Ambiguities: A Unified Approach" provided in Proceedings of the National Conference on Artificial Intelligence (AAAI), pages 806-813 which is incorporated by reference herein in its entirety to identify received text data including a causal relationship. In various embodiments, the classifier 142 uses a Winnow online update algorithm as described in Roth, "Learning to Resolve Natural Language Ambiguities: A Unified Approach" provided in Proceedings of the National Conference on Artificial Intelligence (AAAI), pages 806-813 which is incorporated by reference herein in its entirety, a Support Vector Machine (SVM) or logistic regression to determine whether received data includes a causal relationship. In one embodiment, the classifier 142 also receives input from one or more users, allowing manual classification of received text data as including a causal relationship or having another specified form. For example, the classifier 142 receives manual input identifying data from the training corpus 144 including a causal relationship or other specified form. This allows a user to initially train the classifier 142 using text data from the training corpus 144 which improves subsequent identification of a causal relationship, or other specified form, in subsequently received data.

For example, the classifier 142 extracts features such as word part of speech, parsing and semantic roles of words from training data identified as including a causal relationship or other specified form. Features of subsequently received text data are compared to the features extracted from the classified data and compared with features from subsequently received text data. Hence, the initial training allows the classifier 142 to more accurately identify features of text including a causal relationship or other specified form. However, the above descriptions are merely examples and the classifier can include any information capable of determining whether or not the extracted data includes a causal relationship or other specified form.

The training corpus 144 includes text data, at least a subset of which includes one or more causal relationships, or other specified form. The text data stored in the training corpus 144 is used to improve the accuracy of the classifier 142 and/or the extraction module 146. In one embodiment, the training corpus 144 includes textual data which teaches children about dealing with conditions or describing what happens in specific conditions, or other data describing responses to situations. For example, the training corpus 144 includes text data from the "Living Well" series by Lucia Raatma, the "My Health" series by Alvin Silverstein, Virginia Silverstein and Laura Sliverstein Nunn and/or the "Focus on Safety" series by Bill Gutman. Hence, text data stored in the training corpus 144 provides a source of text data which is used to identify features and/or characteristics of text data including a causal relationship or other specified form and allows use of human input to more accurately identify text data including a causal relationship or other specified form.

The extraction module 146 includes data describing how to generate rules specifying condition-action, cause-effect or other causal relationships from text data to represent knowledge describing how to response to a situation or action acquired from the text data. Hence, text data, such as sentences, can be acquired from a distributed collection system including multiple sources, such as the Internet or multiple users, and the extraction module 146 extracts condition and action components, or other causal data, from the text data. For example, the extraction module 146 includes data describing how to apply semantic role labeling (SRL) to identify verb-argument structures in the received text. For example, the extraction module 146 parses text data to identify sentence structure, such as "If-Then," "When-Then" or similar sentence structures describing a causal relationship by identifying verbs included in the text and the corresponding verb arguments that fill semantic roles. Although described above with regard to identifying syntactic patterns using semantic roles, in other embodiments the extraction module 146 applies other language processing methods, such as generating a dependency tree, computing syntactic relations tuples, determining collocations between words and part of speech or other methods to identify causal relationships included in the text data.

In an embodiment, the computing device 100 further comprises a communication module 150 which links the computing device 100 to a network (not shown), or to other computing devices 100. The network may comprise a local area network (LAN), a wide area network (WAN) (e.g. the Internet), and/or any other interconnected data path across which multiple devices man communicate. In one embodiment, the communication module 150 is a conventional connection, such as USB, IEEE 1394 or Ethernet, to other computing devices 100 for distribution of files and information. In another embodiment, the communication module 150 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication.

It should be apparent to one skilled in the art that computing device 100 may include more or less components than those shown in FIG. 1 without departing from the spirit and scope of the present invention. For example, computing device 100 may include additional memory, such as, for example, a first or second level cache, or one or more application specific integrated circuits (ASICs). Similarly, computing device 100 may include additional input or output devices. In some embodiments of the present invention one or more of the components (110, 120, 130, 140, 142, 144, 146) can be positioned in close proximity to each other while in other embodiments these components can be positioned in geographically distant locations. For example the units in memory 140 can be programs capable of being executed by one or more processors 110 located in separate computing devices 100.

Figure 2:
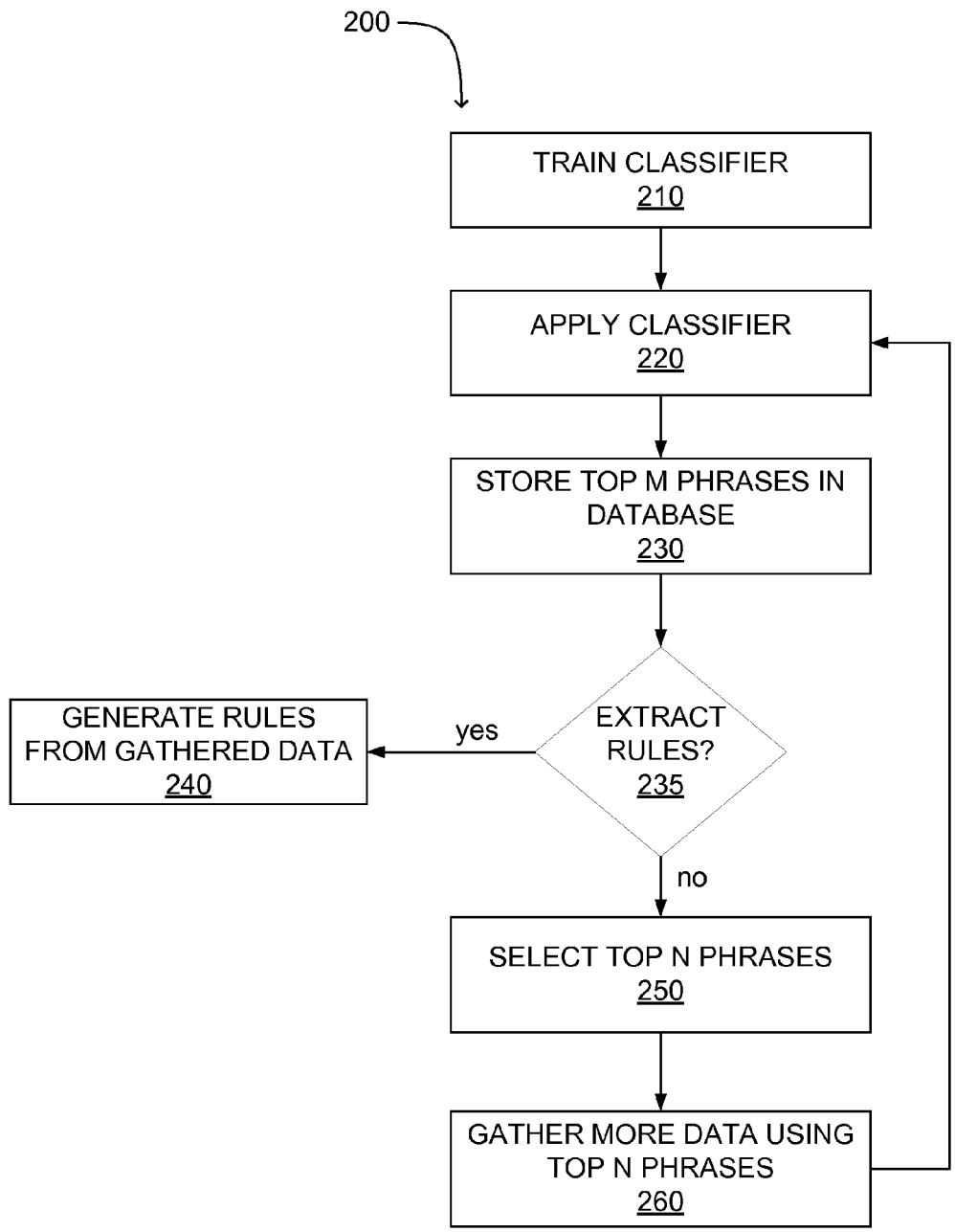
FIG. 2 is a flowchart illustrating a method for knowledge extraction according to one embodiment of the present invention.

FIG. 2 is a flowchart illustrating a method 200 for knowledge extraction according to one embodiment of the present invention. In an embodiment, the steps of the method 200 are implemented by the microprocessor 110 executing software or firmware instructions that cause the described actions. Those of skill in the art will recognize that one or more of the methods may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 2 in different orders. Moreover, other embodiments can include different and/or additional steps than the ones described here.

Initially, text data from the training corpus 144 is used to train 210 the classifier 142 to identify a specified format of text data, such as text data describing a causal relationship. For example, data from the training corpus 144 is manually classified and the results are stored by the classifier 142. During training 210, features, such as part of speech, phrase structure, dependency path and/or semantic role labels are extracted from the training corpus 144 data which is classified as including a causal relationship, or other specific form.

For example, the training corpus 144 includes text data from children's books describing responses to different situations or actions and features, such as the words in the text data and the part-of-speech of the words are extracted from the portions of the children's books describing how to respond to a situation or action. This training 210 allows words which frequently occur in text data including a causal relationship or having another specified format are recognized. In one embodiment, chunk structures, dependency patterns and/or verb-argument structure are also extracted and captured, allowing identification of the sentence structure of text data including causal relationships or another specified format. Training 210 with the training corpus 144 allows the classifier 142 to more accurately identify text data, such as sentences, which include causal relationships, such as condition-action sentences or identify text data having another specified format.

After training 210, the classifier 142 is applied 220 to a corpus of text data, such as a plurality of sentences. This determines if the text data in the corpus includes a causal relationship or another specified form. For example, the classifier 142 identifies text describing a causal relationship, such as text having a condition-action format or a situation-response format, based on the initial training results. For example, verb-argument structures identified by the classifier 142 are compared with the verb-argument structures stored from training 210 to identify the situation and response or cause and effect components from the text data.

In one embodiment, the classifier 142 indicates text data including a causal relationship, such as text including the words "if" or "when," then applies a discriminative learning algorithm to identify text data including a causal relationship or other specified form. A subset of the text data including a causal relationship, or other specified form, is then stored 230 in a database. In one embodiment, conditional probabilities are computed to determine the text data most likely to include a causal relationship and the text data most likely to include a causal relationship is stored. For example, 750 sentences from the text data with the highest probability of including a causal relationship, or other specified format, are stored.

Based on the stored text data, it is then determined 235 if to generate 240 rules from the stored data. In one embodiment, rules are generated 240 responsive to a user input or command. Alternatively, rules are generated 240 after a predetermined amount of text data is stored 230. Rules are then generated 240 from the stored text data. In one embodiment, semantic role labeling (SRL) is applied to the text data to generate 240 the rules. Application of SRL to text data identifies a verb-argument structure in the text data and identifies components of the text data that fill semantic roles, such as agent, patient or instrument while describing an adjunct of the verb included in the text data, such as by indicating locative, temporal or manner. In one embodiment, relative pronouns and their arguments in the text data are indicated, further improving accuracy of the extracted rules. In one embodiment, a column representation, such as the representation described in Carras and Marquez, "Introduction to the conll-2005 Shared Task: Semantic Role Labeling" in Proceedings of CoNLL-2005, which is incorporated by reference herein in its entirety, is used to identify the argument structure of the text data and to represent the rules corresponding to the text data.

Alternatively, rather than generate 240 rules from the stored data, a subset of the stored text data is selected 240 and used to gather 260 additional text data for classification to increase the amount of text data being analyzed, while also providing that the additional text has similar features to classified text which is likely to include a conditional relationship or other specified form. In one embodiment, conditional probabilities of the stored text data are examined to identify stored text data most likely to include a causal relationship and the stored text data most likely to include a causal relationship is selected 250. For example, 400 sentences with the highest conditional probability of including a causal relationship are selected 250 from the stored text data.

Additional data is gathered 260 from a distributed data source, such as the Internet, based on features of the selected text data. Using features from the selected text data ensures that the gathered data is more likely to include a causal relationship, or other specified form. In one embodiment, text data is also compared to one or more parameters as it is gathered 260. For example, sentences with less than 5 words or more than 25 words are removed, limiting the data gathered to text data with a single causal relationship or single specified form. The classifier 142 is then applied 220 to the newly gathered text and data most likely to include the specified form, such as a causal relationship is stored 230 as described above.

Thus, initially training 210 the classifier and using the training results to gather and analyze additional data, the classifier 142 is able to more quickly and accurately increase the amount of data having the specified format stored. This allows use of distributed data sources to rapidly increase the amount of data analyzed for causal relationships and the number of rules subsequently generated from the additional data.

Figure 3:
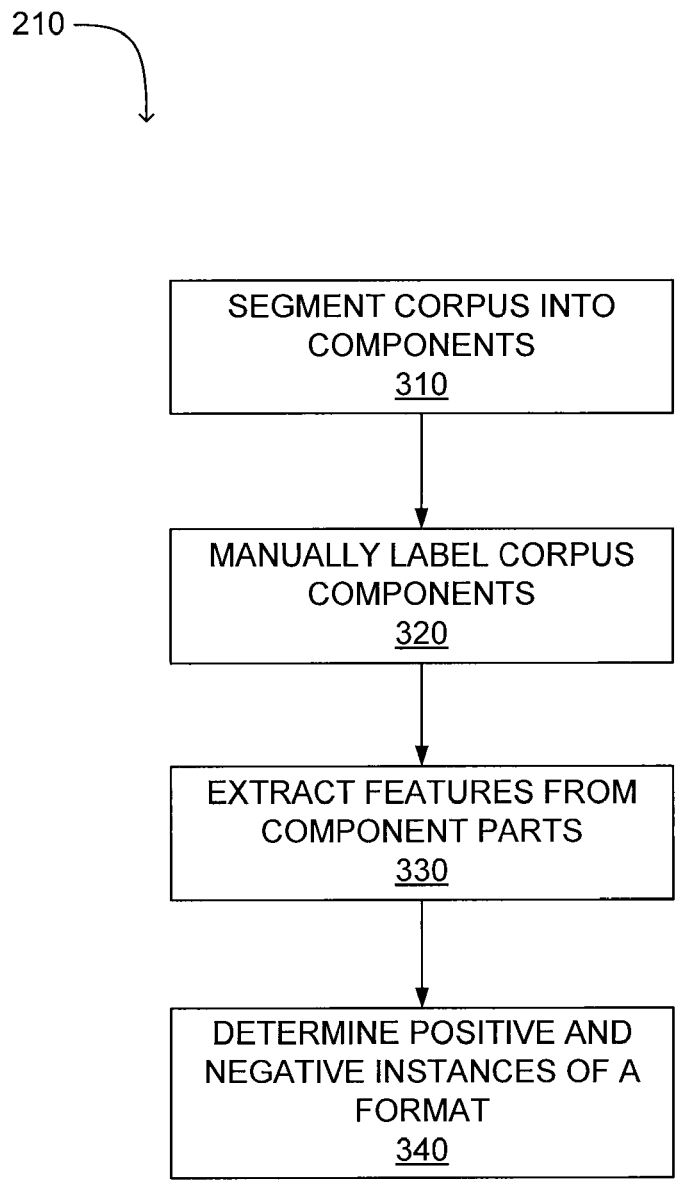
FIG. 3 is a flowchart illustrating a method for training a classifier to identify a data format according to one embodiment of the present invention.

FIG. 3 is a flowchart illustrating a method for training 210 a classifier 142 to identify a specified form according to one embodiment of the present invention. In one embodiment, a training corpus 144 provides text data used for classifier 210 training. Initially, the training corpus 144 is segmented 310 into a plurality of components, such as sentences or phrases. For example, the training corpus 144 comprises children's books or other text data describing how to respond various conditions or what can happen in specific conditions. Segmentation 310 parses the text data in the training corpus 144 into a plurality of sentences.

The corpus components are then manually labeled 320 to identify components having the specified form, such as a causal relationship. For example, one or more human operators labels 320 components having a condition-action format. Manually labeling 320 the corpus components increases the accuracy of the initial classification by allowing a human operator to account for variations in how different text data is worded and to identify the meaning, rather than merely the structure, of the text data. For example, an automated system which labels components including the words "if" or "when" would incorrectly label components which merely include either "if" or "when" but do not have a causal relationship.

Features, such as the relationship between a word and its part of speech, chunk or segment structure of components, dependency relationships and/or semantic roles of verbs and verb arguments in the text data are then extracted 330 from the labeled corpus components. In one embodiment, words from the test corpus and their part-of-speech are identified to specify words which frequently occur in text data having a causal relationship or other specified form. Chunk structures, dependency patterns and verb-argument data are then used to identify the component structure, providing additional data about characteristics of text data having the specified form, such as a causal relationship. For example, a shallow parser, such as one described in Punyakanok and Roth, "Shallow Parsing by Inferencing with Classifiers," in Proceedings of the Annual Conference on Computational Natural Language Learning (CoNLL) (2000) at 107-110 or in Li and Roth, "Exploring Evidence for Shallow Parsing," in Proceedings of the Annual Conference on Computational Natural Language Learning (CoNLL), July 2001 (2001) at 107-110, which are incorporated by reference in their entirety, identifies and extracts phrase structures in the corpus components. The extracted phrases are then analyzed to determine syntactic structure features indicative of text data having the specified form (e.g., sentences that describe responses to actions or situations).

In one embodiment, a dependency parser, such as the principle and parameter based parser ("MINIPAR") described in Lin, "Dependency-Based Evaluation of MINIPAR," in *Workshop on the Evaluation of Parsing Systems*, which is herein incorporated by reference in its entirety, or any other type of lexico-syntactic parsing which identifies relationships between words, is applied to one or more corpus components to determine a syntactic relationship between words in the corpus component. The dependency parser generates a dependency tree or one or more triplets which indicate relationships between words within the corpus components and describe the relationship between subject, main verb and object of a corpus component having the specified form. In one embodiment, SRL is applied to one or more corpus components to provide data describing verb-argument structures in the corpus components by identifying words which fill semantic roles, and the roles of the identified words.

Positive and negative instances of a format are determined 340. For example, a set of sentences may be analyzed and labeled as either a positive example or a negative example of a condition-action format. The extracted features may be used to determine how closely different corpus components represent positive instances of the specified form. This allows features from corpus components having the desired format, such as condition-response or cause-effect, to be identified and used for analyzing characteristics of subsequently collected text data. By identifying training corpus components most similar to the desired format and features of these corpus components, the classifier 142 identifies features indicative of text data having the specified form and examines additional data for similar features, increasing data classification accuracy.

Figure 4:
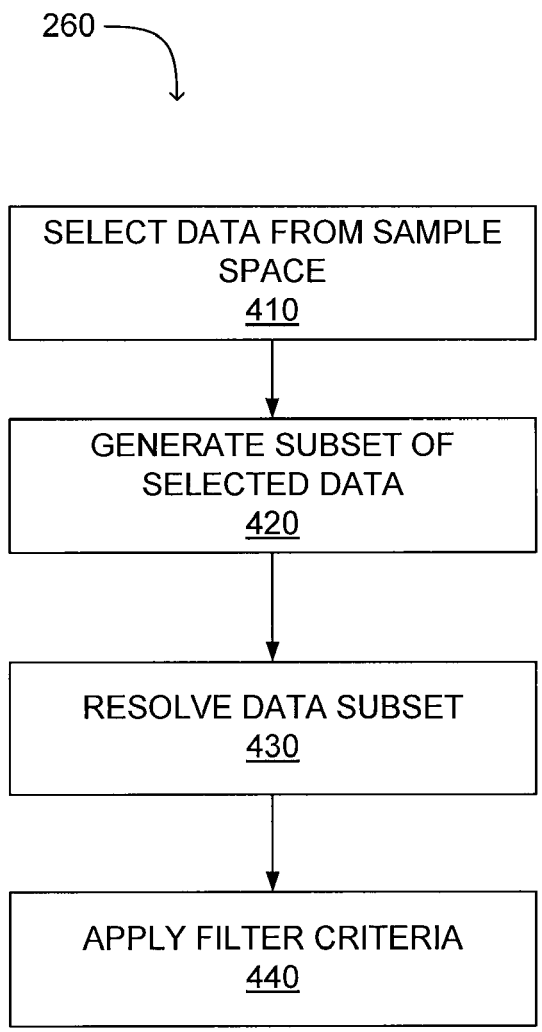
FIG. 4 is a flowchart illustrating a method for gathering text data including a specified format according to one embodiment of the present invention.

FIG. 4 is a flowchart illustrating a method for gathering 260 data having a specified format according to one embodiment of the present invention. Initially, data is selected 410 from a sample space. In one embodiment, the sample space comprises a distributed data source, such as the Internet, from which text data is selected 410. In another embodiment, the sample space comprises a locally stored text library, such as an electronic version of a book or one or more electronic documents. A subset of the selected data is then generated 420 to reduce later data processing by comparing the selected data to one or more parameters For example, sentences with less than 5 words and/or sentences with more than 25 words are discarded, limiting the subset of data to text data which includes a single instance of the specified form. For example, application of maximum and minimum length parameters limits the subset to text data including a single response to a single condition.

The contents of the data subset are then resolved 430 to correct inconsistencies and/or defects in the data. For example, resolving 430 the data clarifies components, such as subject, object and/or verb, of the text data by modifying characteristics of the data subset. In one embodiment, pronouns in the data subset which refer to a person or an object mentioned in data not included in the subset are resolved, such as by replacing the pronoun with the corresponding person or object. Local coherence is captured, such as described in Barzilay and Lapata, "Modeling Local Coherence: An Entity Based Approach," in Proceedings of the ACL, Jun. 25-30, 2005, which is incorporated by reference herein in its entirety, so that the discourse in which certain text data occurs is captured and used to clarify the content of the data.

Filter criteria are then applied 440 to the data subset to remove inaccurate or incomplete data. For example, text data which merely markets commercial products is discarded so the data subset includes text data that describes a causal relationship rather than marketing statements. Additionally, data in the subset is examined for completeness, for example, by determining whether the data includes a subject and a verb. Incomplete data, such as data which was incorrectly captured (e.g., includes only sentence fragments or includes parts of different sentences or a sentence fragment and a title), is discarded. This limits analysis of additional data to data that is most likely to include a causal relationship.

Figure 5:
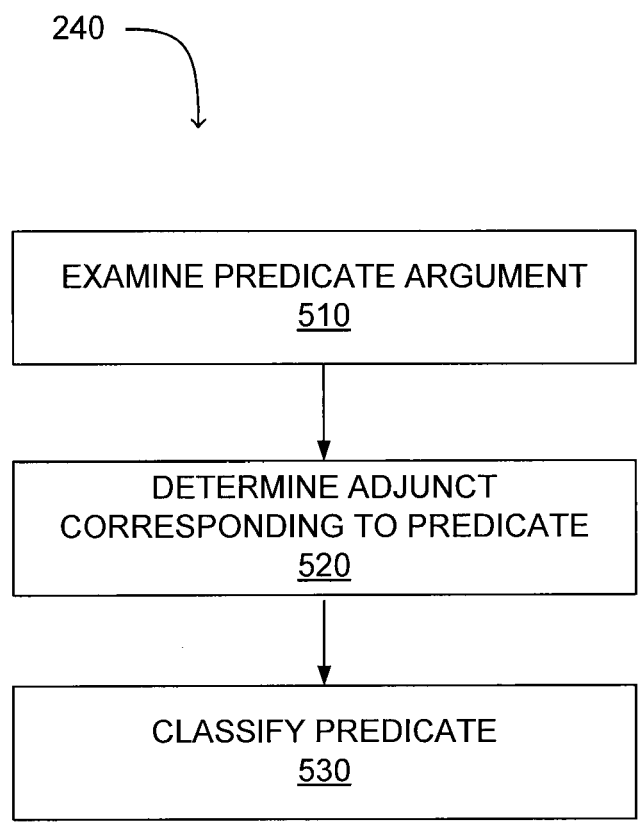
FIG. 5 is a flowchart illustrating a method for generating action rules from classified text data according to one embodiment of the present invention.

FIG. 5 is a flowchart illustrating a method for generating 240 action rules from classified data according to one embodiment of the present invention. After identifying text data having the specified form, such as text data having a condition-action format, components of the text data, such as the condition and action parts of the text data, are extracted and used to generate 240 rules that represent knowledge gained from the text data. In one embodiment, Semantic Role Labeling (SRL) is applied to the text data to identify and examine 510 of a predicate argument, or arguments of a verb, in the text data. The examined predicate argument forms the anchor of the rule corresponding to the text data.

The adjunct corresponding to the predicate argument is then determined 520 and evaluated. The adjuncts in the sentence determine whether the predicate argument corresponds to a situation or an action, and specifies the classification 530 of the predicate argument. In one embodiment, adjuncts associated with adverbial modification, location, discourse marker, cause, purpose or temporal adjuncts cause classification 530 of the predicate argument as a condition. The remaining part of the sentence is then classified 530 as the action corresponding to the condition.

FIG. 6 is an example of a generated rule according to one embodiment of the present invention. In FIG. 6, an example rule corresponding to the input sentence 610 "If you see trouble, report it to an adult" is shown.

Application of Semantic Role Labeling (SRL) to the sentence 610 identifies the verbs 620 in the sentence 610 and the arguments 625, 635 of the verbs 620. This verb 620 and argument 625, 635 identification allows identification of the condition 615 in the sentence 610. In the example of FIG. 6, one condition 615 is identified corresponding to the clause "if you see trouble."

The type of adjunct 630 corresponding to the predicate argument 625 structure of the verbs 620 is determined and used to classify the verb 620 and arguments 625 as a condition or an action. In the example of FIG. 6, the "if you see trouble" clause corresponds to an adverbial modification adjunct 630, so it is classified as a condition 615. The remaining clause in the sentence 610, "report it to an adult" is classified as an action corresponding to the condition 615.

FIG. 7 is an example of a generated rule according to one embodiment of the present invention. For purposes of illustration, FIG. 7 shows a rule generated from the sentence 700 "If it is raining, you should have the umbrella before going outside."

As a result of the Semantic Role Labeling (SRL), verbs 740, and arguments 745 of the verbs 740, are identified and used to identify the conditions 715, 725 in the sentence. In the example of FIG. 7, the identified verbs 740 are "rain" and "have"; the identified arguments 745 of the verbs 740 are the metaphorical agent "it", the owner "you", the agent "should", the patient "the umbrella", and the verb "going"; and two conditions 715, 725 are identified corresponding to the clauses "if it is raining" and "before going outside". The type of adjunct 720, 730 corresponding to each condition is identified. As shown in FIG. 7, the "if it is raining" clause corresponds to an adverbial modification adjunct 720, which causes its classification as a condition 715. The "before going outside" clause corresponds to a temporal adjunct 730, so it is also classified as a condition 725. The remaining clause, "you should have the umbrella" is then classified as the action corresponding to the conditions 715, 725.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method performed by a computer for using a classifier to find text data having a specific format, the method comprising the steps of:
    training the classifier to identify the specific format using data stored in a training corpus, wherein training comprises identifying positive and negative instances of the specific format within components of the training corpus;

applying the trained classifier to a text corpus to identify components of the text corpus having a feature which corresponds to a characteristic of the specific format;

identifying a subset of the identified components of the text corpus with an above-threshold probability of having a feature which corresponds to the characteristic of the specific format;

gathering additional text data based on the identified subset of components of the text corpus;

applying the trained classifier to the additional text data to identify components of the additional text data having the feature which corresponds to a characteristic of the specified format;

generating by a computer rules from the identified subset of components of the text corpus and the identified components of the additional text data specifying the format of the identified subset of components of the text corpus and the identified components of the additional text data, wherein the rules correspond to the feature of the identified subset of components of the text corpus and the identified components of the additional text data; and storing the generated rules in a computer storage medium.

2. The method of claim 1, wherein the step of training the classifier to identify the specific format further comprises the steps of:

segmenting the training corpus into components;

receiving input which identifies one or more components of the training corpus having the specific format; and extracting features from the one or more components of the training corpus having the specific format.

3. The method of claim 2, wherein the step of extracting features from the one or more components of the training corpus comprises the steps of:

identifying a word within the training corpus and a part of speech associated with the identified word;

parsing the training corpus into one or more groups of words;

determining a syntactic relation between a plurality of words within the training corpus; and identifying a verb-argument structure in a group of words within the training corpus.

4. The method of claim 1, wherein the training corpus comprises text data describing a response to a situation.

5. The method of claim 1, wherein generating a rule from a component of the identified subset of components of the text corpus or the identified components of the additional text data comprises the steps of:

examining a predicate argument of the component having the specific format;

determining an adjunct associated with the predicate argument; and classifying the predicate argument based on the determined adjunct associated with the predicate argument.

6. The method of claim 1, wherein the step of gathering additional text data comprises the steps of:

retrieving text data from a distributed data source; and generating a subset of text data from the retrieved text data corresponding to text matching a parameter of a component of the identified subset of components of the text corpus.

7. The method of claim 6, wherein the parameter comprises a maximum or minimum number of words included in the retrieved text.

8. The method of claim 6, further comprising the step of:

resolving data defects in text included in the generated subset of text.

9. The method of claim 8, wherein the step of resolving data defects in text comprises the steps of:

resolving a pronoun within the subset of text from the retrieved text data by replacing the pronoun with a corresponding noun; and determining a discourse in which a component of the subset of text occurs.

10. The method of claim 1, wherein the rules are generated by applying semantic role labeling to the components of the identified subset of components of the text corpus or the identified components of the additional text data.

11. A method performed by a computer for using a classifier to find text data having a specific format, the method comprising the steps of:

training the classifier to identify the specific format using data stored in a training corpus;

applying the trained classifier to a text corpus to identify components of the text corpus having a feature which corresponds to a characteristic of the specific format;

identifying a subset of the identified components of the text corpus with an above-threshold probability of having a feature which corresponds to the characteristic of the specific format;

gathering additional text data based on the identified subset of the components of the text corpus;

applying the trained classifier to the additional text data to identify components of the additional text data having the feature which corresponds to a characteristic of the specified format;

generating by a computer rules from the identified components of the additional text data specifying the format of the identified components of the additional text data, wherein the rules correspond to the feature of the identified components of the additional text data, and wherein the rules are generated by applying semantic role labeling to the identified components of the additional text data; and storing the generated rules in a computer storage medium.

12. The method of claim 11, wherein the step of training the classifier to identify the specific format comprises the steps of:

segmenting the training corpus into components;

receiving input which identifies one or more components of the training corpus having the specific format; and extracting features from the one or more components of the training corpus having the specific format.

13. The method of claim 12, wherein the step of extracting features from the one or more components of the training corpus comprises the steps of:

identifying a word within the training corpus and a part of speech associated with the identified word;

parsing the training corpus into one or more groups of words;

determining a syntactic relation between a plurality of words within the training corpus; and identifying a verb-argument structure in a group of words within the training corpus.

14. The method of claim 11, wherein the training corpus comprises text data describing a response to a situation.

15. The method of claim 11, wherein generating a rule from a component of the identified components of the additional text data comprises the steps of:

examining a predicate argument in the component having the specific format;

determining an adjunct associated with the predicate argument; and classifying the predicate argument based on the determined adjunct associated with the predicate argument.

16. The method of claim 11, wherein the step of gathering additional text data comprises the steps of:
retrieving text data from a distributed data source; and
generating a subset of text data from the retrieved text data corresponding to text matching a parameter of a component of the identified subset of components of the text corpus.

17. The method of claim 16, wherein the parameter comprises a maximum or minimum number of words included in the retrieved text.

18. The method of claim 16, further comprising the step of:
resolving data defects in text included in the generated subset of text by:
resolving a pronoun within the subset of text from the retrieved text data by replacing the pronoun with a corresponding noun; and
determining a discourse in which a component of the subset of text occurs.

* * * * *